(12) United States Patent
Iskhakbayev

(10) Patent No.: US 6,609,401 B1
(45) Date of Patent: Aug. 26, 2003

(54) CAR WHEEL ANTI-THEFT DEVICE

(76) Inventor: Yuriy Iskhakbayev, 105-40 62 Rd., #3N, Forest Hills, NY (US) 11375

( * ) Notice: Subject to any disclaimer, the term of this patent is extended or adjusted under 35 U.S.C. 154(b) by 0 days.

(21) Appl. No.: 10/238,004

(22) Filed: Sep. 10, 2002

(51) Int. Cl.⁷ .............................................. B60R 25/00
(52) U.S. Cl. ........................... 70/225; 70/232; 70/260; 411/910; 411/402; 81/121.1
(58) Field of Search .................. 70/225, 226, 229–232; 81/121.1, 176.15; 411/402, 910

(56) References Cited

U.S. PATENT DOCUMENTS

| | | | | |
|---|---|---|---|---|
| 810,340 A | * | 1/1906 | Meis | 81/121.1 |
| 1,160,064 A | * | 11/1915 | Gates | 81/121.1 |
| 1,231,164 A | * | 6/1917 | Jahns et al | 411/910 X |
| 1,447,564 A | * | 3/1923 | Norlund et al | 411/910 X |
| 1,792,711 A | * | 2/1931 | Rockstad | 411/910 X |
| 2,286,950 A | * | 6/1942 | Beedlove | 411/910 X |
| 2,316,695 A | * | 4/1943 | Jaffa | 411/910 X |
| 2,708,844 A | * | 5/1955 | Cincel | 70/170 |
| 3,519,979 A | * | 7/1970 | Bodenstein | 411/910 X |
| 3,821,975 A | * | 7/1974 | Haker | 70/260 X |
| 3,874,258 A | * | 4/1975 | Semola et al | 81/121.1 |
| 3,930,428 A | * | 1/1976 | Hale | 81/121.1 |
| 4,018,111 A | * | 4/1977 | Goldhaber | 81/71 |
| 4,322,195 A | | 3/1982 | Rebish | |
| 4,569,259 A | * | 2/1986 | Rubin et al. | 81/121.1 |
| 4,580,935 A | * | 4/1986 | Treihaft | 411/910 X |
| 4,649,620 A | | 3/1987 | Omori | |
| 4,690,167 A | | 9/1987 | Skipper | |
| 4,742,702 A | | 5/1988 | Swertz | |
| 4,809,569 A | * | 3/1989 | Erb | 81/121.1 |
| 4,856,307 A | | 8/1989 | Hauser | |
| 4,869,633 A | | 9/1989 | Hayashi | |
| 4,897,008 A | * | 1/1990 | Parks | 411/910 X |
| 4,905,547 A | * | 3/1990 | Nigrelli | 81/176.15 |
| 5,112,176 A | * | 5/1992 | McCauley et al. | 411/910 X |
| 5,797,659 A | | 8/1998 | Fuller | |
| 5,803,690 A | * | 9/1998 | Savinsky | 411/402 X |
| 5,863,166 A | * | 1/1999 | Young | 411/910 X |
| D422,205 S | * | 4/2000 | Hussaini | D8/397 |
| 6,305,890 B1 | * | 10/2001 | Okamura | 411/910 X |
| 6,321,623 B1 | | 11/2001 | Dykes | |

* cited by examiner

*Primary Examiner*—Suzanne Dino Barrett
(74) *Attorney, Agent, or Firm*—Boris Leschinsky

(57) ABSTRACT

A car wheel anti-theft device having a lug nut and a sleeve installed onto the bolt of the car wheel and an individual wrench to install and remove the lug nut from the bolt. The lug nut and the sleeve each include an engaging flange. When the lug nut is secured within the sleeve, the engaging flange of the sleeve engages the engaging flange of the lug nut, thereby preventing the bolt from being removed and the wheel from being moved. The lug nut has a front surface having a key projection of a particular shape. The individual wrench includes a cylindrical cavity having a bottom surface. The bottom surface has a key opening extending from the bottom surface towards the depth of the individual wrench. The key opening preferably has a shape complementing the particular shape of the key projection of the lug nut. In order to install or remove the lug nut, a user will align the key opening of the individual wrench with the key projection of the lug nut, insert the key projection into the key opening and then rotate the wrench until the lug nut is installed or removed.

5 Claims, 3 Drawing Sheets

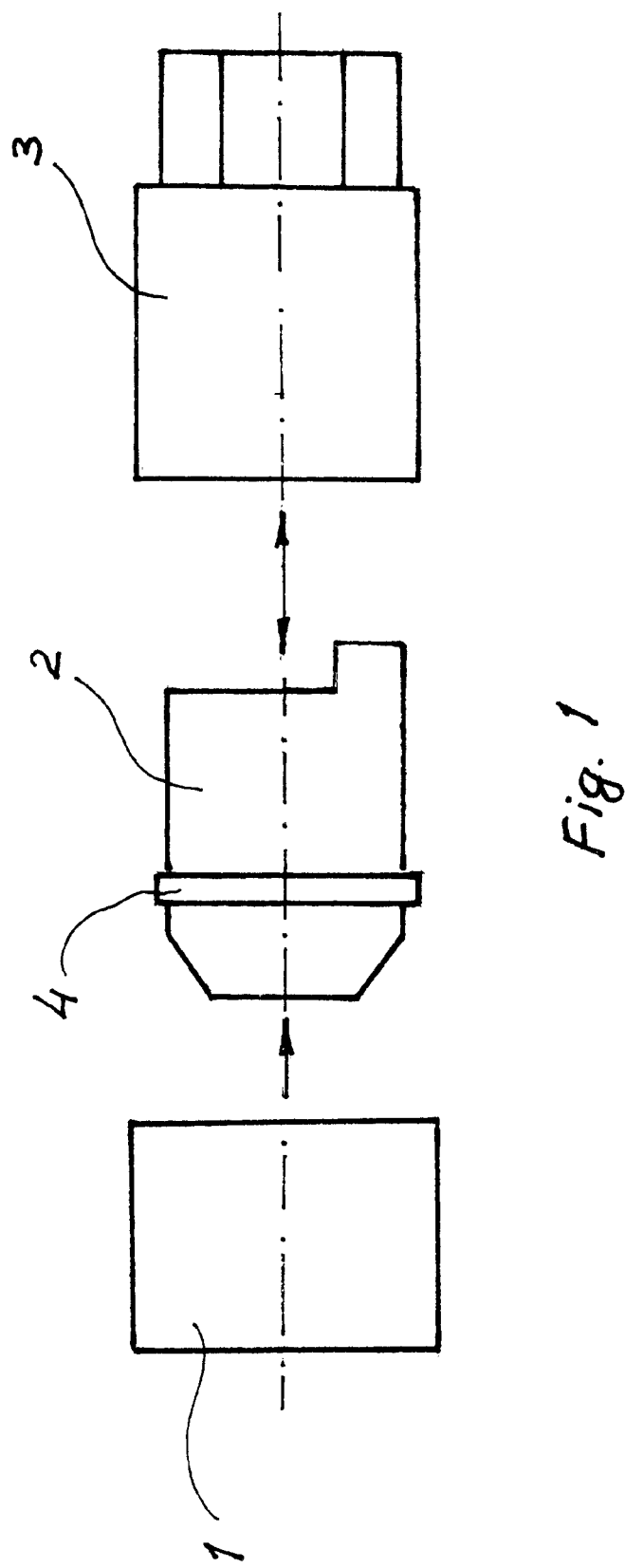

CAR WHEEL ANTI-THEFT DEVICE

FIELD OF THE INVENTION

The invention generally relates to lug nuts for wheels and tires. More particularly, the invention relates to a lug nut, which is lockable and unlockable with a use of an individual wrench.

BACKGROUND OF THE INVENTION

Lockable lug nuts have been used on vehicle wheels to prevent tire theft and to insure the stable attachment of the wheel to the vehicle axle. The conventional lockable lug nut is available in three forms. The first form is composed of a lug nut with a hollow depression at its top with an irregularly surfaced interior insert. The lock or key with a compatible irregular surface is inserted into the nut and force applied to lock or unlock the nut threaded on the lug bolt.

The second conventional lockable lug nut consists of similar construction, though taller than the norm. The interior of the lug nut is threaded, with two opposing interior indentations located at one end of the lug nut. The key is affixed to the cavity apex of a socket, similar to that regularly used in conjunction with a socket wrench. The key has two retractable protrusions located near its base. The socket with the key, when inserted, covers the lug nut. The protrusions engage the indentations and lock the socket with key in place. Force in the form of rotary motion is then applied to fasten or unfasten the nut.

A third form of the prior art is a lug nut and washer apparatus, where the lug nut covers a key and the key engages the washer. The key is cylinder shaped with a flat disc base. A multitude of short prongs are mounted on the underside of the base. The prongs engage corresponding holes on the washer, which then abuts the corresponding holes on the washer, then abuts the key and covering nut. Force is exerted to engage the key and washer, which in turn fastens or unfastens the lug nut and washer apparatus to the bolt.

The above described lug nuts configurations are relatively complicated and therefore difficult to manufacture.

SUMMARY OF THE INVENTION

Thus, it is an object of the present invention to provide a car wheel anti-theft device, which is easy to manufacture, yet guarantees an adequate protection against theft.

The present invention provides a car wheel anti-theft device having a lug nut and a sleeve installed onto the bolt of the car wheel and an individual wrench to install and remove the lug nut from the bolt. The sleeve is placed onto the bolt of the car wheel. The lug nut and the sleeve each comprise an engaging flange. When the lug nut is secured on the bolt within the sleeve, the engaging flange of the sleeve engages the engaging flange of the lug nut, thereby preventing the wheel from being moved. In the preferred embodiment, the lug nut comprises a front surface having a key projection of a particular shape.

An individual wrench is provided with the lug nut and sleeve combination of the present invention. The individual wrench includes a cylindrical cavity having a bottom surface. The bottom surface has a key opening extending from the bottom surface towards the depth of the individual wrench. The key opening preferably has a shape complementing the particular shape of the key projection of the lug nut. In order to install or remove the lug nut, a user will align the key opening of the individual wrench with the key projection of the lug nut, insert the key projection into the key opening and then rotate the wrench until the lug nut is installed or removed.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which:

FIG. 1 is a schematic side view of the sleeve, lug nut and the individual wrench in accordance with the preferred embodiment of the present invention.

DETAILED DESCRIPTION OF THE PREFERRED EMBODIMENT AND THE DRAWINGS

Figure 3:
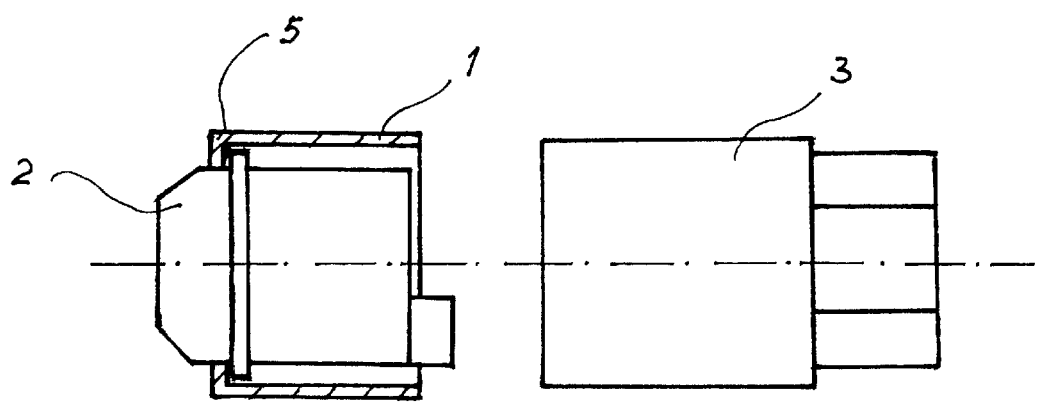
FIG. 3 is a cross-sectional view of the lug nut and sleeve combination and a side view of the individual wrench.
Figure 2:
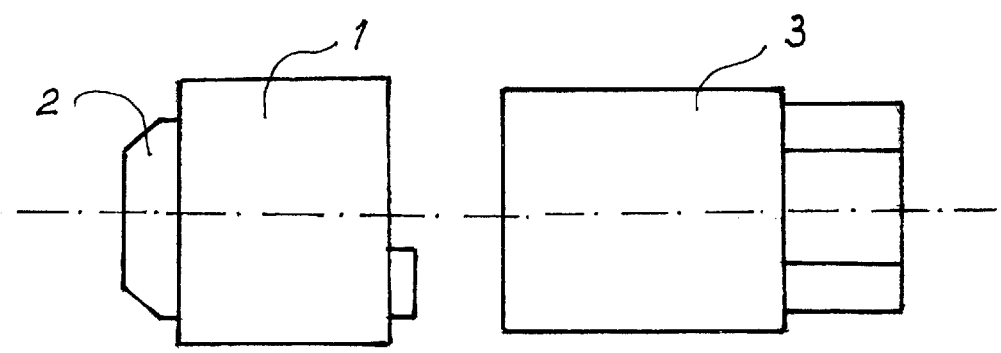
FIG. 2 is a side view of the lug nut and sleeve combination and the individual wrench.

The preferred embodiment of the present invention is generally shown in FIG. 1. In the preferred embodiment, the car wheel anti-theft device comprises a sleeve 1, a lug nut 2 and an individual wrench 3. When in use, the sleeve is installed onto one of the bolts securing the car wheel. The lug nut 2 preferably includes an engaging flange 4 and an internal threading 9, shown in FIG. 5. Similarly, the sleeve 1 includes an engaging flange 5, shown in FIG. 3. When the lug nut is screwed onto the bolt of the car wheel inside the sleeve, the engaging flange 5 engages the engaging flange 4, thus preventing the bolt from being removed and the car wheel from being displaced. The mutually engaged combination of the lug nut and the sleeve is shown in FIG. 2.

Figures 4, 5:
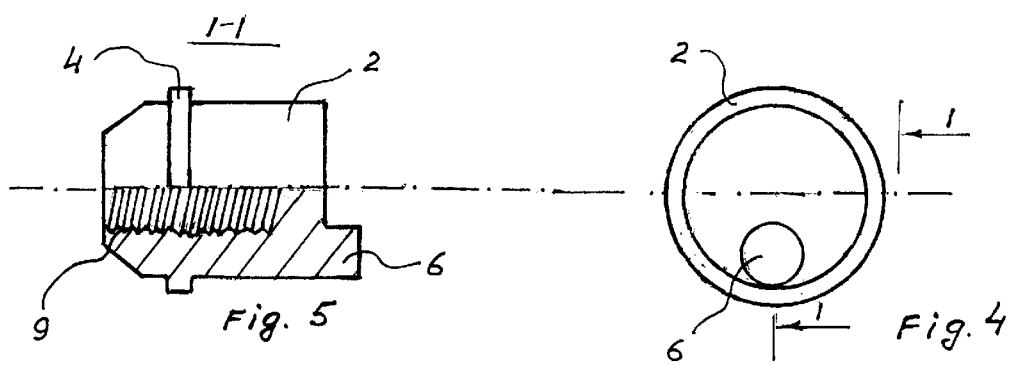
FIG. 4 is a front view of the lug nut in accordance with the preferred embodiment of the present invention.
FIG. 5 is a cross-sectional side view of the lug nut taken along line I—I of FIG. 4.
Figures 6, 7:
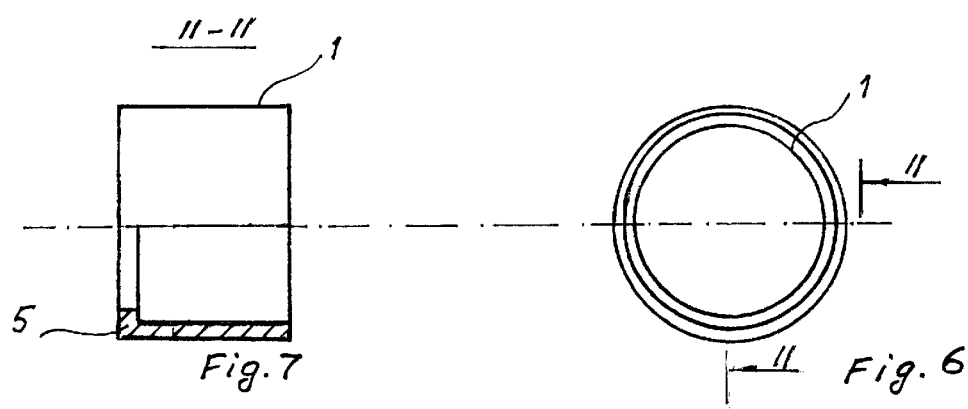
FIG. 6 is a front view of the sleeve in accordance with the preferred embodiment of the present invention.
FIG. 7 is a cross-sectional side view of the sleeve taken along line II—II of FIG. 6.
Figure 10:
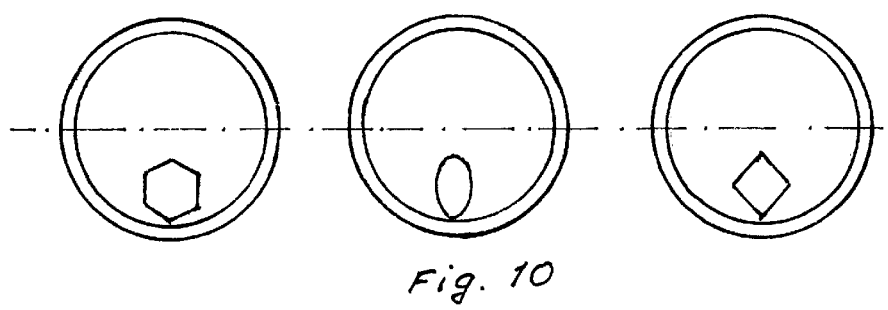
FIG. 10 is a front view of a plurality of lug nuts having differently shaped key projections.

As shown in FIGS. 4 and 5, the lug nut preferably includes a key projection 6 located on a front surface of the lug nut. When the lug nut is installed into the sleeve, shown in FIGS. 6 and 7, the key projection 6 projects toward the outside of the sleeve. Although, the key projection is shown and described as located at the bottom of the front surface of the lug nut, it is to be understood that the key projection can be placed anywhere on the front surface. The key projection 6 has a particular shape. Various possible shapes of the key projection are shown in FIG. 10.

Figures 8, 9:
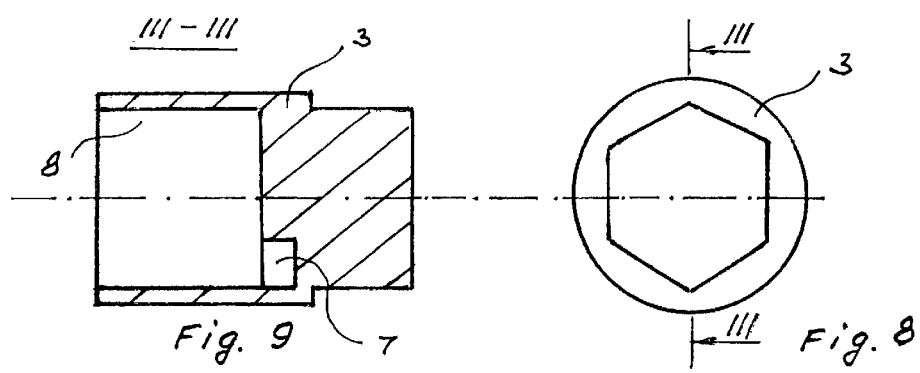
FIG. 8 is a front view of the individual wrench in accordance with the preferred embodiment of the present invention.
FIG. 9 is a cross-sectional side view of the individual wrench taken along line III—III of FIG. 8.

The preferred embodiment of the individual wrench 3 is shown in FIGS. 8 and 9. The individual wrench preferably includes an inside cylindrical cavity 8 having a bottom surface. An inside diameter of the inside cavity 8 is preferably slightly larger than the outside diameter of the lug nut 2. The bottom surface includes a key opening 7 having a shape, which is complimentary to the particular shape of the key projection 6 of the lug nut 2.

In use, when the lug nut 2 is to be installed or removed from the car wheel bolt inside the sleeve 1, the key opening 7 of the individual wrench 3 is first aligned with the key projection 6 of the lug nut. The key projection 6 is then inserted into the key opening 7, thus locking the individual wrench with respect to the lug nut. The individual wrench 3 is then turned until the lug nut 2 is installed or removed from the bolt.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A car wheel anti-theft device comprising in combination:

a lug nut adapted to be installed onto a bolt securing said car wheel, said lug nut having a round external side surface and a front surface with a key projection of a particular shape placed thereon, said lug nut also having a sleeve engaging means extending from said external side surface at a location opposite said front surface, a sleeve having a lug nut engaging means extending inside said sleeve, said means adapted to engage with said sleeve engaging means of said lug nut allowing said sleeve to freely rotate about said lug nut when said sleeve is placed onto and about thereof, said sleeve covering the external side of said lug nut to form a cylindrical space therebetween, and an individual wrench having a cylindrical portion sized to be placed into said cylindrical space between said lug nut and said sleeve, said wrench also having a bottom surface of said cylindrical portion with a key opening having a shape complementing said particular shape of said key projection.

2. The car wheel anti-theft device as in claim 1, wherein said particular shape of said key projection is an annular shape.

3. The car wheel anti-theft device as in claim 1, wherein said particular shape of said key projection is a diamond shape.

4. The car wheel anti-theft device as in claim 1, wherein said particular shape of said key projection is an elliptical shape.

5. The car wheel anti-theft device as in claim 1, wherein said particular shape of said key projection is a pentagon shape.

* * * * *